(12) United States Patent
Wandinger et al.

(10) Patent No.: US 8,527,271 B2
(45) Date of Patent: Sep. 3, 2013

(54) METHOD FOR SPEECH RECOGNITION

(75) Inventors: Michael Wandinger, Salmdorf (DE); Jesus Fernando Guitarte Perez, Munich (DE); Bernhard Littel, Munich (DE)

(73) Assignee: Nuance Communications, Inc., Burlington, MA (US)

( * ) Notice: Subject to any disclaimer, the term of this patent is extended or adjusted under 35 U.S.C. 154(b) by 480 days.

(21) Appl. No.: 12/452,707

(22) PCT Filed: Jun. 18, 2008
(Under 37 CFR 1.47)

(86) PCT No.: PCT/EP2008/057646
§ 371 (c)(1),
(2), (4) Date: May 14, 2010

(87) PCT Pub. No.: WO2009/010358
PCT Pub. Date: Jan. 22, 2009

(65) Prior Publication Data
US 2010/0286984 A1 Nov. 11, 2010

(30) Foreign Application Priority Data
Jul. 18, 2007 (DE) .......... 10 2007 033 472

(51) Int. Cl.
*G10L 15/04* (2006.01)

(52) U.S. Cl.
USPC ............ 704/251; 704/246; 704/247; 704/252

(58) Field of Classification Search
USPC .................. 704/246, 247, 251, 252
See application file for complete search history.

(56) References Cited

U.S. PATENT DOCUMENTS

| | | | |
|---|---|---|---|
| 6,061,653 A * | 5/2000 | Fisher et al. | 704/256.5 |
| 6,223,155 B1 * | 4/2001 | Bayya | 704/243 |
| 7,181,399 B1 * | 2/2007 | Rahim et al. | 704/257 |
| 8,180,641 B2 * | 5/2012 | Levit et al. | 704/255 |
| 2003/0014255 A1 | 1/2003 | Steingrubner et al. | |
| 2003/0182131 A1 * | 9/2003 | Arnold et al. | 704/275 |
| 2004/0030552 A1 * | 2/2004 | Omote et al. | 704/245 |
| 2004/0034527 A1 | 2/2004 | Hennecke et al. | |
| 2004/0148164 A1 * | 7/2004 | Baker | 704/231 |
| 2005/0273334 A1 * | 12/2005 | Schleifer et al. | 704/255 |
| 2007/0124057 A1 | 5/2007 | Prieto et al. | |
| 2010/0217593 A1 * | 8/2010 | Shields et al. | 704/245 |

FOREIGN PATENT DOCUMENTS

| | | |
|---|---|---|
| CA | 2 372 676 | 5/1996 |
| EP | 0 601 778 | 6/1994 |
| EP | 1 162 602 | 12/2001 |

* cited by examiner

*Primary Examiner* — Leonard Saint Cyr
(74) *Attorney, Agent, or Firm* — Sunstein Kann Murphy & Timbers LLP (57) ABSTRACT

A method for the voice recognition of a spoken expression to be recognized, comprising a plurality of expression parts that are to be recognized. Partial voice recognition takes place on a first selected expression part, and depending on a selection of hits for the first expression part detected by the partial voice recognition, voice recognition on the first and further expression parts is executed.

16 Claims, 6 Drawing Sheets

METHOD FOR SPEECH RECOGNITION

CROSS REFERENCE TO RELATED APPLICATIONS

This application is based on and hereby claims priority to PCT Application No. PCT/EP2008/057646 filed on Jun. 18, 2008 and DE Application No. 102007033472 filed on Jul. 18, 2007, the contents of which are hereby incorporated by reference.

BACKGROUND OF THE INVENTION

Methods for speech recognition as a supplement for man-machine-interfaces are becoming more and more widely used. Meanwhile, command recognition or selections from address book entries in mobile devices, such as mobile phones, are standard functions. Especially in automobiles, speech recognition systems are applied to record e.g. starting point and end point in a navigation system.

Conventional speech recognition systems are for example based on Hidden-Markov-models, which enable speaker-independent speech recognition but require a high computing time. Since, particularly in vehicles embedded systems are often employed as computing entities, having limited computing and storing resources, simplified speech recognitions have to be conducted. A constraint of the search space for the search term to identify will, in general, lead to smaller demands in computing power and storage capacities. However, such a constraint in search space and the following saving of resources is often coming along with less reliable speech recognition and/or less comfortable handling for the user.

In DE10207895A1 a method for speech recognition is described in which stepwise speech recognition for the input of expressions having several parts, commands respectively, is proposed. There is provided, e.g. for the input of a city and the following input of a street name, to conduct the speech recognition for a single expression with the spoken street name, which is shown on a display in form of a hit list. After confirmation of the user a second vocabulary for further speech recognition adjusted on the city can be designated which has less memory requirements than the combination of city and street name. It is disadvantageous, however, that the user has to acknowledge the outcome of the recognition of the city name and manually has to choose from the hit list.

Further, it is especially desirable to recognize a complete address input, which comprises e.g. city, street name and house number, in one single step, perceivable for the user, using speech recognition, and to output a direct selection of complete target addresses. Conventionally, such an elongation of the expression to be recognized will lead to extremely high requirements in memory and computing power of the speech recognition device due to the numerous expression parts. For this reason the shortest possible commands or command sequences were recognized by speech recognition and presented to the user in the past.

SUMMARY

It is one potential object to provide an optimized method for speech recognition.

Consequently, the inventors propose a method for speech recognition for expressions having several expression parts that have to be recognized. For this, firstly partial speech recognition is conducted on a first selected expression part and, depending on the recognized selection of the first expression part, speech recognition for the first and the following expression parts is conducted.

Although the expression to be recognized has several different expression parts, like e.g. the expression of a target address containing city plus street name plus house number, it is not necessary for the user to confirm specific expression parts or recognized expression parts. Since firstly an expression part taken from the complete expression is extracted, a smaller vocabulary can context-dependently be used for partial expression recognition, e.g. basically focused on cities. The corresponding context is taken from the intermediate result, not perceivable for the user, of the first partial expression recognition. The recognized selection of hits by the partial expression recognition enables for example to repeatedly subject the complete expression to a speech recognition which, due to the pre-selection by the partial speech recognition requires a significantly reduced vocabulary compared to all possible combinations of city, street name and house numbers. By this lower requirements for memory and computing capacity are attained.

In the method the first expression part is subjected to a partial speech recognition using a Hidden-Markov-Model. All other parts of the expression are covered using fill data for the partial expression recognition. Those fill data, also known as trash data or garbage data, just require a small memory and computing space to generate a corresponding vocabulary pursuant to a Hidden-Markov-Model. If, for example, a partial expression to recognize is placed at the beginning of the complete expression, as it is the case with the input of an address by a city name, a specific number of phonemes firstly captured with respect to time can be trained in the course of the Hidden-Markov-Model with known city names of a database, while the other captured expression parts are trained using garbage or fill phoneme. The second step can be, to substitute the expression parts, previously covered with garbage data, with search words from the search vocabulary, e.g. street names. The vocabulary can be significantly reduced in this second step which recognizes the complete expression, since only consistent potential search terms have to be modeled by the Hidden-Markov-Model, that have been previously selected by the partial expression recognition. In principal, it makes no difference in which timely position of the expression the first expression part is located, which forms the basis of the first speech recognition step. Even an expression in which the expression part to recognize is encircled by other expression parts can be processed according to the proposed method.

Further, it is possible to identify the first part of an expression by determining the timely course of the energy level of the complete expression and to perform partial expression recognition. Generally, expression parts are separable by detectable speech intermissions in such a way that a significantly low energy level at a specific point of time of the expression is taken as an indication for gaps between parts of the expression. It is further possible to use known methods of speech activity recognition to detect the first expression part of the complete expression.

Preferably, the method for speech recognition comprises one or more of the following steps:

Recording an expression comprising several expression parts;

Providing a first vocabulary, which comprises a first list of search terms, phoneme combinations and/or transition probabilities;

Execution of partial expression recognition for the selected first expression part of the recorded expression using the provided first vocabulary for defining a selection of hits from the list of search terms;

Providing a second vocabulary, dependent on the choice of hits, the second vocabulary comprising a list of search term combinations of several search terms, phoneme combinations and/or transition probabilities; and Execution of speech recognition of the recorded expression using the second vocabulary for determining a selection of hits from the list of search term combinations.

The recording of the expression can for example be carried out by a microphone and a downstream analogous-/digital-converter which provides the digital expression to further computing units, e.g. a CPU in an embedded system. The first vocabulary will be created for example by a controlling or computing entity which accesses a search term database and according phoneme transcriptions of the search terms. Establishing of a speech recognition vocabulary usually requires high computing power and/or comprehensive memory space for buffering of the readable and processable vocabulary of speech recognition being e.g. software implemented.

Within the second step of speech recognition which in contrast to the related art is not confirmed or verified by the user, further information from the hits of the partial speech recognition is added to the second vocabulary. This could e.g. be the creation of a vocabulary, which adds consistent street names to the recognized best city name from the partial recognition step.

It is e.g. possible that there is a database which comprises all city names of a country and all street names and the appendant house numbers. The first vocabulary needed for the partial speech recognition would simply have to access to the city names as a generic term apart from the garbage data. As further terms within the second speech recognition step, street names and house numbers are added as subtopics. However, not all possible street names within the speech recognition database are relevant, but only those which are related to the city name as a generic term, and have been identified as hits from the partial speech recognition.

Advantageously, in one possible version of the method for speech recognition the first vocabulary will be deleted from the memory before the second vocabulary is imported. An efficient use of memory will, thus, be guaranteed especially in embedded systems by this approach.

To use the resources of a the speech recognition system more efficiently, another version of the speech recognition method allows for reuse of characteristics of the first partial speech recognition of the expression and/or an expression part in further expression parts and/or in the complete expression.

Especially, in partial speech recognition or creation of a vocabulary calculated MFCC-attributes and/or emission probabilities come into consideration. MFCC (Mel Frequency Cepstral Coefficients) are perceived as computable characteristics of recorded audio expressions. Determining of MFCC's can be executed according to generally known methods that can be performed by an accordingly programmed CPU of the speech recognition system.

Reuse within the second speech recognition step, for example of the complete expression, reduces the computing complexity of the speech recognition. Further, variants and derivatives of MFCCs can be used.

The inventors further propose a speech recognition device. The speech recognition device preferably features a controlling unit and a memory unit which are connected to a database device. The database device provides search terms of a vocabulary and/or a phonemic transcription of the search terms. The database device can for example be embellished as a removable medium, such as a DVD, a SD-card, a USB-disk, a CD-ROM or other known memory devices. Such databases for navigation systems or other speech recognition applications are marketed for example in a SAMPA-format. In this case SAMPA is known as Speech Assessment Method Phonetic Alphabet. This complies with a phonetic alphabet which describes a machine-readable encoding as ASCII symbols of phonetic alphabets.

Further, the inventors propose a computer program product which initiates the performance one of the preceding methods for speech recognition on a program-controlled speech recognition device. The realization of the computer program product is conceivable, for example, as a computer software being saved on a computer-readable data carrier. CD-ROM's, Floppy-disks, DVD's, USB-disks, memory cards or other memory devices can be considered as well as the supply as a downloadable file on a server.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
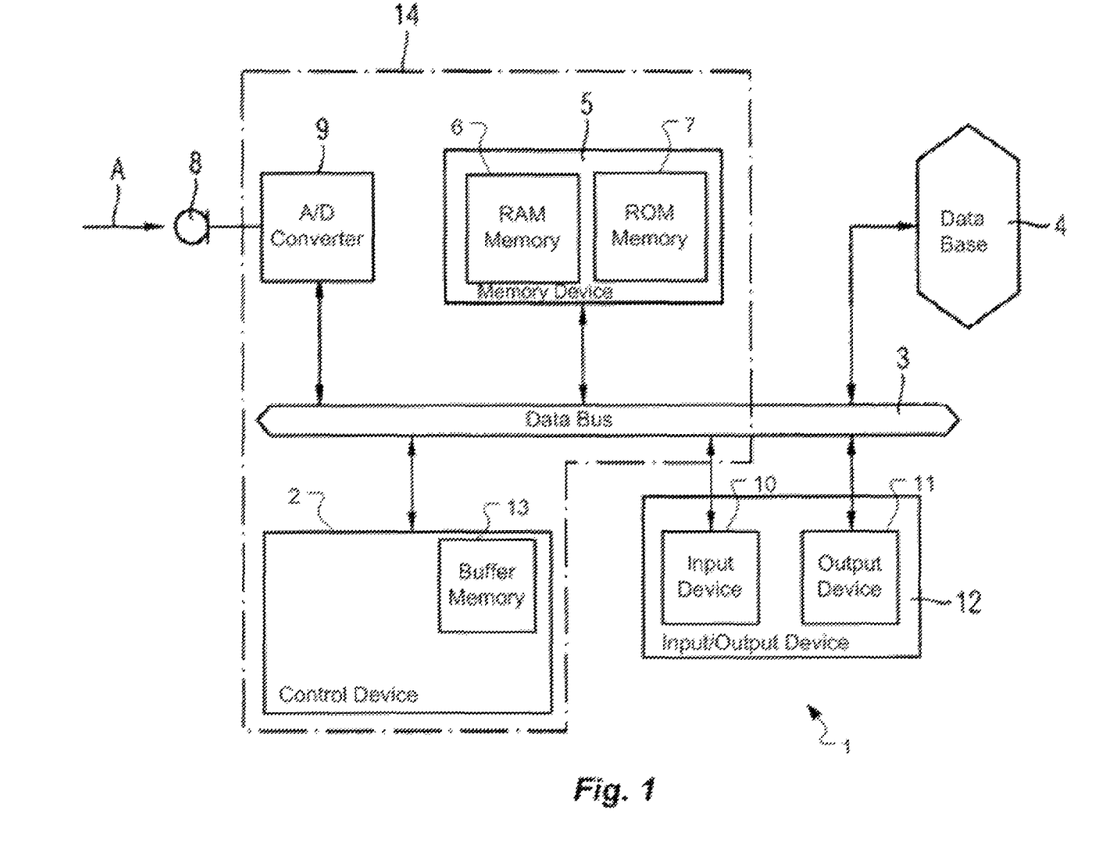
FIG. 1 is a schematic block diagram of a speech recognition device.

FIG. 1 shows a schematic block diagram of a speech recognition device 1. The speech recognition device 1 can be arranged, for example, as an embedded system for use in a vehicle, for example for a navigation system. A control device 2, for example a microprocessor or a CPU, is provided and is preferably programmable having an internal memory for example a buffer memory 13. Further, a memory device 5 is provided having for example a RAM memory 6 and a ROM memory 7. The ROM memory can, for example, contain the operating system or control programs for the CPU 2.

Memory 5 and CPU 2 are interconnected which is depicted in FIG. 1 as a communication and data bus 3. It is possible for the database 4 to be placed, for example, in the rear trunk of a vehicle, while data communication between CPU 2 and database 4 takes place via a vehicle bus system, e.g. the I2C-bus. It is also thinkable to transfer specific data records in database 4 temporarily to RAM-memory 6 of the memory device 5 to build a speech recognition vocabulary.

An analogous/digital-converter 9 being connected to a microphone 8 is further coupled to the communication and data bus 3. An expression A is consequently recorded by microphone 8 and digitally provided by the analogous/digital-converter 9. The control unit or the CPU 2 coordinates storage in memory 5. Further, the speech recognition device 1 can embody an input device 10 and an output device 11. This is, for example, implemented by a GUI (Graphic User Interface). As an input device 10 a keyboard, a rotary knob or any other haptic device can, for example, taken into consideration. As output devices 11 e.g. a display or speech output is possible.

Especially the CPU 2, the memory 5 and the analogous/digital-converter 9 together with an appropriate data communication bus 3 are often implemented as embedded systems. In doing so, the expenditure of production and space is desired to be as small as possible, so that a corresponding CPU or a microprocessor will usually be operated at a clock frequency of 300 to 600 MHz. But also other values are conceivable. Memory elements of 64 to 128 MB memories often have to suffice as RAM-memories 6. Those limited resources with respect to the computing capacity of CPU 2 and memory resources 5 entail especially resources-saving methods for speech recognition.

Sequential input and acknowledgement of every single part of an expression, as for example the city name first and, after prompting once again, the address in form of the street name and house number, is cumbersome although the size of the vocabulary used for speech recognition can be limited.

Figure 2:
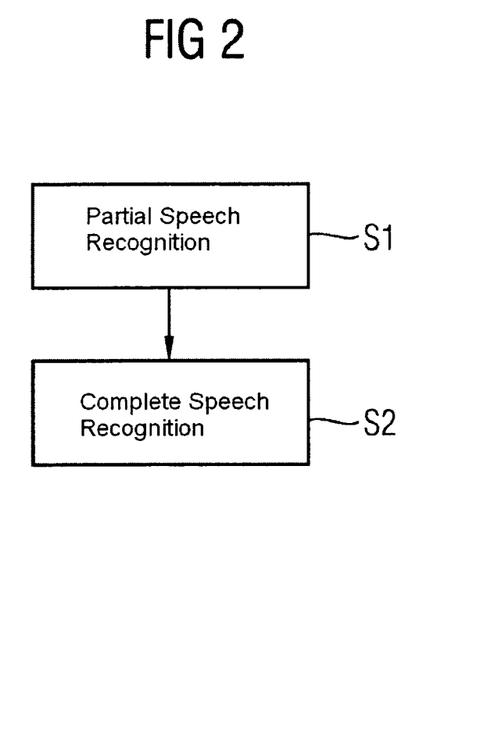
FIG. 2 is a flow chart of a first variant of the method for speech recognition.

In FIG. 2 a schematic flow chart of an optimized method for speech recognition for multi-part expressions is schematically illustrated. Here, a two-step method is presented in which first a partial speech recognition in step S1 or in recognition stage S1 is conducted and afterwards a complete speech recognition in step S2 is accomplished.

Within the first step S1, the recognition is limited to an expression part of the complete expression, and the other expression parts are covered, for example, by trash models or garbage data. Using the example of the input of a target address for a navigation system, in a first recognition step S1, using partial expression recognition, only the city names are kept in the active vocabulary. Street names and house numbers are modeled by garbage data or filling phonemes. This can, for example, be carried out within the framework of a Hidden-Markov-Model.

In a Hidden-Markov-Model (HMM) for speech recognition, transition probabilities from one phoneme to the next phoneme of a sequence are considered. Phonemes are the smallest meaning-distinctive units in a language system. A Hidden-Markov-Model is therein characterized through parameters $\lambda=(A, B, \pi)$, wherein $A=\{aij\}$ the transition probability from one (hidden) state i to state j, $\pi=\{\pi i\}$ the starting probability for state i and $B=\{bi\}$ the output probability i, while a certain state i emits an observation $O_t$ at the time t. In a Hidden-Markov-Speech-Recognition-Model a sequence of phonemes is recorded and the probability for producing the phoneme devolution according to a HMM is determined.

Every HMM complies, for example, with one class, so that by choice of the highest probability the recorded phoneme sequence can be assigned to a class, a word or a sequence of words.

Using known Hidden-Markov-technology, speaker-independent speech recognitions can be implemented. For this purpose, Hidden-Markov-Models for phonemes of a language are trained. Usually, big search terms recorded in the surrounding of the speech recognition, which are stored in databases, are used. Respective databases include the search terms, such as city names and their transcription into phonemes. Known are, for example, SAMPA-transcriptions. In usual speech recognition algorithms, phonemes are modeled context-dependently, e.g. by triphones. The recent phoneme is modeled differently depending on the antecessor and successor phoneme.

Usually, the vocabulary for speech recognition algorithms or for an appropriately equipped speech recognition device is dynamically generated, as for example in FIG. 1 the CPU 2, being implemented by an operating system or a control program. For this purpose, the phoneme sequence of the search term to recognize has to be initially indicated and to be compiled into a comprehensible from for the speech recognition. That is, it is first necessary to indicate the phoneme sequence of the search terms to be recognized, and to compile it into a form which is understandable for speech recognition. This means that the phoneme sequences taken from database 4 are converted to state sequences. The larger the number of search terms, the higher is the computational complexity for the generation of the vocabulary, for example by CPU 2. In the first step of speech recognition, that is step S1 of the partial expression recognition, this is only done for city names being located in Germany for example. These are about 70.000 search terms. For the complete speech recognition within the second step or in step S2, another recognition vocabulary is created, which in this example of the input of a target address does not have to comprise all possible street names, city names and house numbers, but is significantly reduced.

In Germany, approximately 370.000 street names exist. The first step of the partial expression recognition reduces, however, the number of 370.000 search terms to 200 to 15.000 terms only. For example, if N hits are determined within the first step S1, in the second step only a vocabulary for performing of speech recognition is arranged that comprises the relevant street names for the N hits in city names. For averaged 30 streets per city name, vocabularies in between 200 and 15.000 terms at a hit rate of N=10 hits are created. Comprised in this is also Berlin as the biggest city having 13.000 streets.

Within the second speech recognition step S2 for the complete expression recognition of the recorded expression having several expression parts usually a smaller vocabulary is necessary than for the first partial recognition step S1, since in step S2 only the N best fitting city names are accounted for. Further, more logical connections between city names and according street names can be accounted for in a grammar. It is for example possible that in different cities having different city names the same street name exists but a different number of house numbers. Such logical connections can be implemented by a grammar for the speech recognition.

To further improve the creation of recognition vocabularies it is possible to precompile and to buffer street vocabularies for city names that have assigned a particularly high number of streets. Cities having just a small number of streets, for example less than a predefined threshold, usually have smaller street vocabularies that can be created online during the operation of speech recognition. Nevertheless, in the case of precompiled street vocabularies, a faster access by the CPU is possible.

Further, the memory requirement of the corresponding speech recognition system is reduced in this way, since just the especially big vocabularies are saved; the smaller ones are created directly by online accessing the phonemes in the database.

Figure 3:
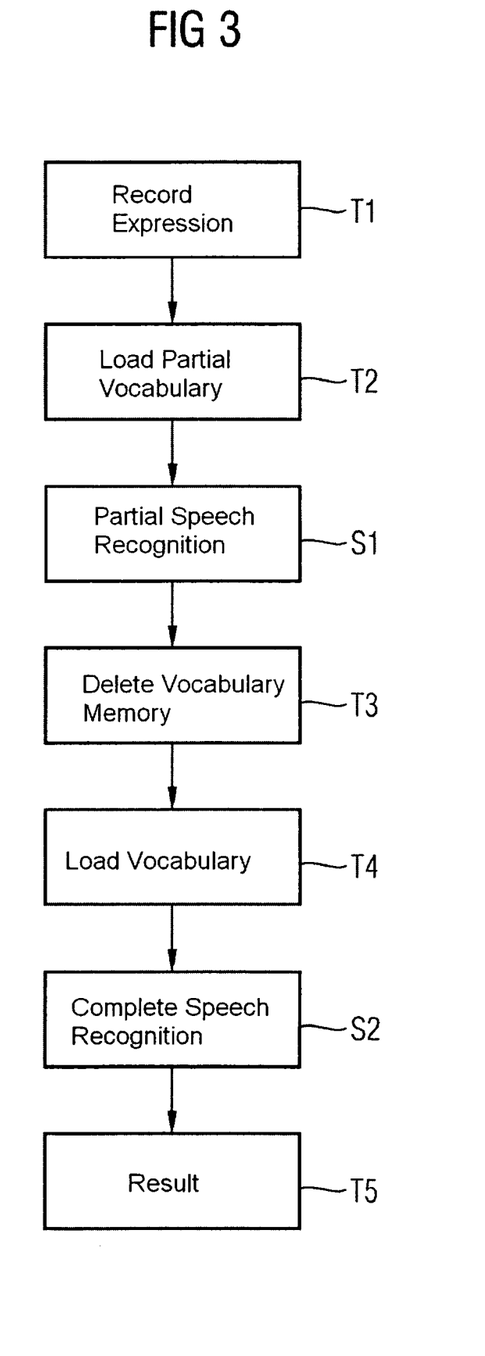
FIG. 3 is a flow chart of a second variant of the method for speech recognition.

In FIG. 3, a variant of a two-step method for speech recognition is presented. In a first step T1, the expression is recorded. This could, for example, be carried out recoursing to the speech recognition device in FIG. 1 by a microphone 8 and the analogous/digital-converter 9. The corresponding data could digitally be stored in memory 5 and preferably in RAM memory 6. The storing processes can be coordinated by CPU 2 being programmable and controlled by an operating system in ROM-memory 7.

Within the following step T2 a partial vocabulary is loaded or is created online. For this purpose search terms, for example city names and their corresponding phoneme transcription, are loaded from database 4 and stored in memory 6. After this, a corresponding partial vocabulary for performing of the actual speech recognition or partial recognition is created in step S1.

As previously mentioned, expression parts, that presumably do not contain relevant street names and house numbers, can be covered by garbage data during the execution of the speech recognition algorithm, for example by use of a HMM-model.

Figure 4:
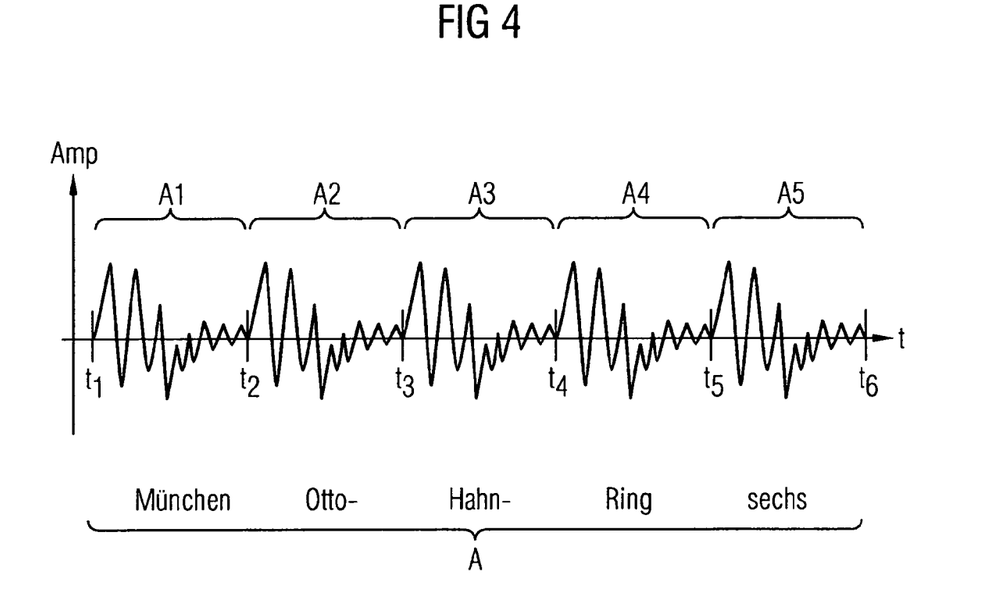
FIG. 4 is a schematic depiction of a multi-part expression.

In FIG. 4 an expression A having several expression parts A1-A5 is schematically represented. The graphic representation shows the amplitude of the acoustic wave being recorded by the microphone over time t. The user, for example, enters the complete search term "München Otto-Hahn-Ring sechs". This address input can be regarded as an expression A comprising five parts. The city name "München" corresponds to the first expression part A1, "Otto" corresponds to the second expression part A2, "Hahn" corresponds to the third expression part A3, "Ring" corresponds to the fourth expression part A4 and the house number "sechs" corresponds to the fifth expression part A5. Hereby, the lingual output of "München" takes from time $t_1$ to time $t_2$, "Otto" from time $t_2$ to time $t_3$, "Hahn" from time $t_3$ to time $t_4$, "Ring" from time $t_4$ to time $t_5$ and "sechs" from time $t_5$ to $t_6$.

There are several possibilities to identify the expression parts. For example, a HMM-model can be created, assuming that the first expression part A1 corresponds to a city name, and thus a generic term for all other expression parts, namely street and house number. It is, for example, possible to create so called garbage-models that contain phonemes of city names in the database, for example "München" and other garbage data phonemes. For example, different paths for speech recognition can be modeled:

<München><trash><trash><trash><trash><trash><trash>
<Mün nchlingen><trash><trash><trash><trash>
<Mün nchhausen><trash><trash>

Within the complete phoneme sequence which correspond to the complete expression, i.e. the input of a complete target address in one sentence without breaks, phoneme parts are covered with garbage data, presumably not being city names. This could be the expression part, according to the example in FIG. 4 that follows a predefined number of starting phonemes. By the implementation of a corresponding HMM-model for speech recognition, only considering the relevant expression parts, that is the first expression part A1, are relevant for the first step, a significantly smaller vocabulary and thereby a smaller memory space can be used than for a HMM-model which is forced to consider all expression parts A1-A5.

It is also conceivable to determine the beginning and the end of different parts of the expression A1-A5 by a measurement of energy of the expression. Often, a break or a significantly low energy level of the sound occurs in-between spoken words. In FIG. 4, this occurs especially at moments of $t_1$, $t_2$, $t_3$, $t_4$, $t_5$ and $t_6$. Determination of such minima can be used to identify borders between different parts of the expression. However, there are more known standardized speech activity recognizers. To identify borders of words a so called VAD (Voice Activity Detection)-method is used. In principal, any method to determine the respective part is possible for the first recognition step S1.

Usual speech recognition methods exhibit sequential steps, such as, feature or characteristic computation, emission calculation and search. Within the feature computation, the recorded audio signal is converted to features, for example MFCC features. These, conventionally standardized, features can be extracted from the audio signal to perform the actual speech recognition. MFCCs can, for example, be calculated by subdividing the recorded audio signal or the expression, into blocks or windows. A Fourier-transformation is performed on every window and a magnitude spectrum is generated. A logarithmic operation is performed on the magnitude spectrum to imitate the human aural perception. The usually high number of resulting frequency bands is concentrated to a modicum, for example to 40. Afterwards, a discrete cosine transformation is performed or a main component analysis is conducted. The calculation of MFCCs is generally known.

Within the following speech recognition step, the calculated features, e.g. MFCCs, are compared with the vectors, determined by the HMM.

Out of this a distance or measure for the deviation of the segments in the HMM will result. This is also called emission or emission probability. The underlying vocabulary for speech recognition exhibits state series having a sequence of segments. In the last search step, a search based on emissions of the recognition vocabulary and optionally a grammar or a language model is performed to determine a recognition finding or a hit from the vocabulary or the search vocabulary. For example a tree search is possible, but even other search algorithms, to identify the expression or the part of the expression, recorded in the vocabulary of the HMM-model.

Figure 5:
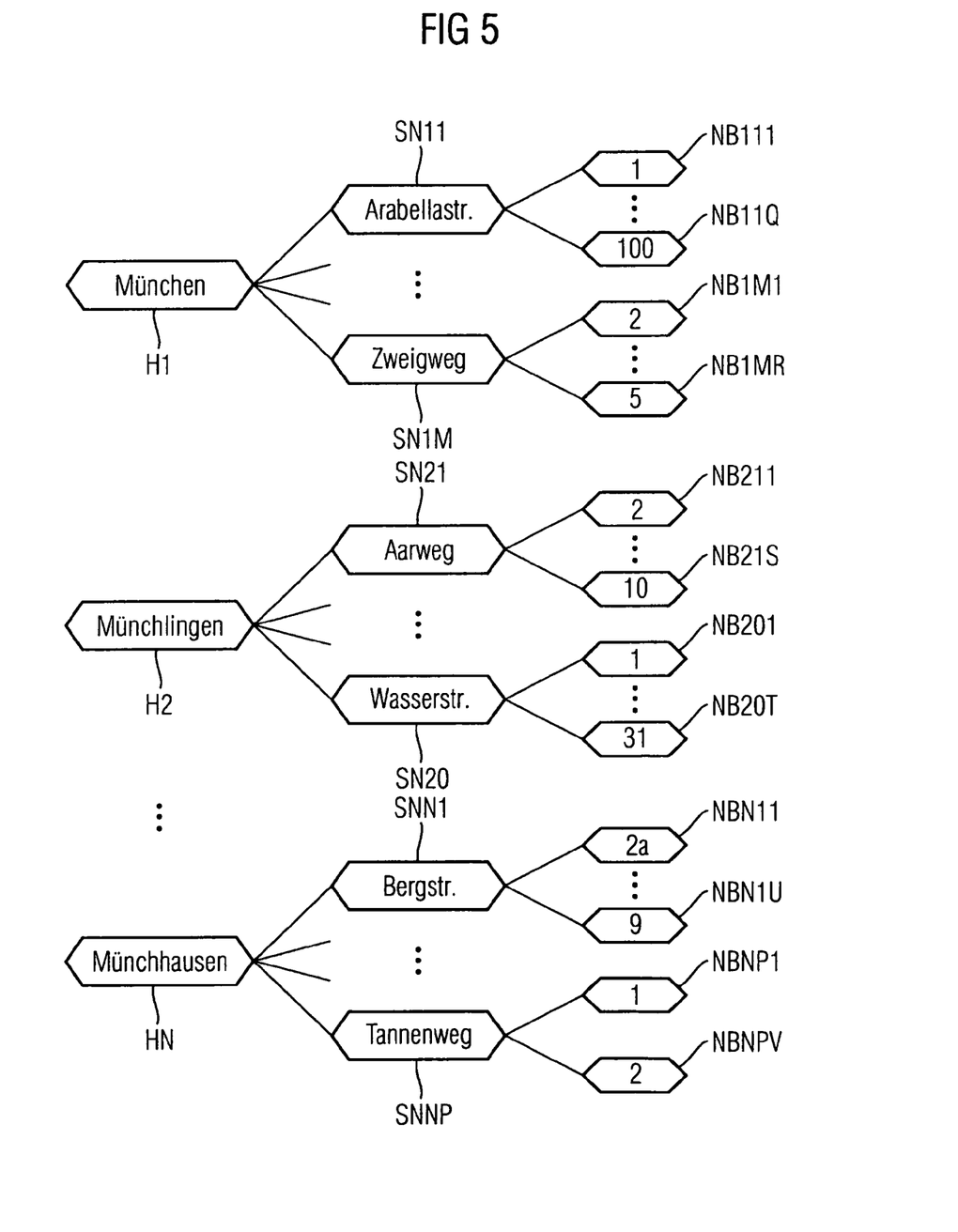
FIG. 5 is a schematic hierarchical structure of a search term database.

The partial speech recognition in step S1 provides therefore a hit list having N list congruencies for city name. This is shown in FIG. 5 on the left side. The partial speech recognition determines, for example, "Mün nchen" H1, "Münnchlingen" H2 and other records up to "Münnchhausen" HN as possible hits.

Referring to FIG. 3, the vocabulary can now be deleted from the memory in step T3. Another vocabulary is created in step T4 for the second step of the speech recognition method and is entered into the memory. The corresponding recognition vocabulary is created by reading the street names relating to the hits H1-HN in the city names.

For the first hit München H1 as presented in FIG. 5 central column, M street names are needed. In a correspondingly hierarchically organized database, for example, SN11-SN1M entries are assigned to "München" H1. For the second best hit H2 "Münchlingen" street names SN21-Sn2O exist in database O. For the $N^{th}$ hit HN "Mün nchhausen", SNN1-SNNP entries are available in the database. Further, the house numbers of the according street names SN11-SN1M, Sn21-SN2O and SNN1-SNNP are necessary to perform a complete speech recognition of the target input "München Otto-Hahn-Ring 6".

It is not necessary to use the maximum number of possible house numbers for every street name for the vocabulary. Rather, it can be accounted for, for example, the Arabellastrasse SN11 in München, having 100 house numbers NB111-NB11Q being Q=100. In another city a different number of house numbers could be possible. The Zweigweg SN1M in München H1 for example just has four house numbers NB1M1-NB1MR being R=4.

Analogous to this, the vocabulary for the complete speech recognition, that is the complete expression A is arranged and compiled only as combinations of search terms, that is city names, street names and house numbers, in a way that is necessary depending on the first partial speech recognition finding, which are the hits H1-HN. By this drastic reduction of the recognizing vocabulary for the recognition of the complete expressions A, an implementation with or on resource-weak computing systems becomes possible. Further, by reducing the volume of transferred data between database 4 and embedded system 14, even the transfer time for initializing the speech recognition is smaller.

In the following complete speech recognition step S2 a corresponding finding by hits is generated for example by HMM-speech recognition. This is shown for example to the user via an output device, e.g. a display, in step T5. By a reduced search space, that is the specially predetermined reduced vocabularies for the complete speech recognition in step S2, the recognition rate is especially high, since illogical or impossible combinations of search terms are excluded or at least blanked by the special choice and creation of the recognition vocabulary.

To further reduce the computing load for CPU 2, it is possible to reuse already calculated computations of the partial speech recognition of step S1, for example the determination of features like MFCCs, and take said into consideration during the creation of the complete vocabulary and/or the complete speech recognition in step S2. The features or emission probabilities from the first partial speech recognition step S1 can be buffered and reused in the second complete speech recognition step S2. By this, repeated computation, being redundant, is avoided.

Apart from the example of a target input in a navigation system for a vehicle, even other applications are possible. It is for example possible for a MP3-player or a general audio player which should be voice-controlled, to let the user speak the complete sentence including artist, album and title, and initially conduct a partial speech recognition on the expression part containing the artist. The user never has to manually split the complete expression into parts or to acknowledge single expression parts. The present method enables particularly convenient and user-friendly speech recognition for multipartite or multiple-part expressions to recognize.

Figure 6A:
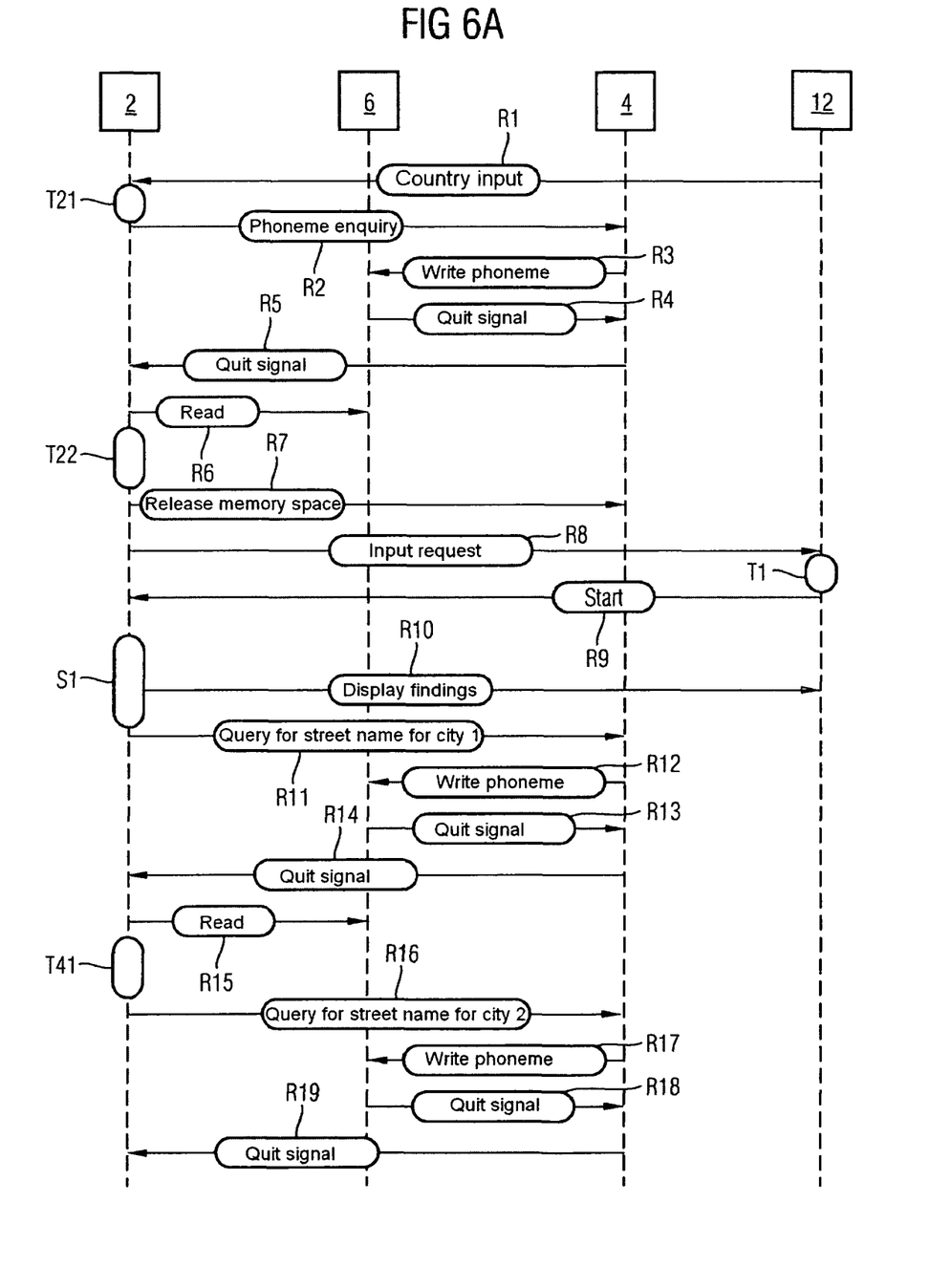
FIG. 6a, 6b is an example of flow chart in a speech recognition device when carrying out a method for speech recognition.
Figure 6B:
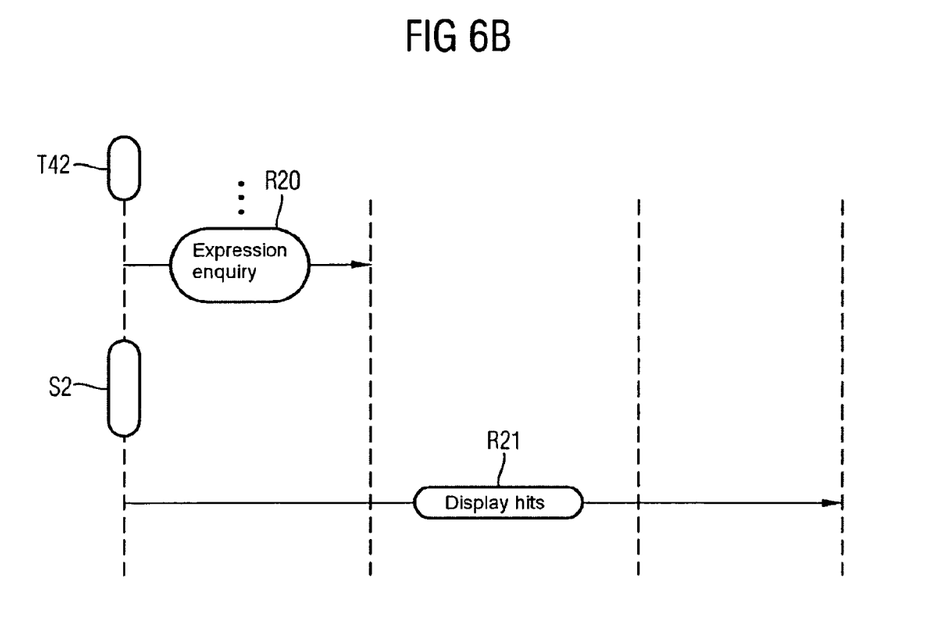

FIGS. 6A and 6B show a possible flow chart for a two-step speech recognition method following one variant. The time axis runs from the top to the bottom, while four parallel dashed lines are covered with actions or steps, being executed by different elements or devices of a speech recognition system or speech recognition device, as represented in FIG. 1.

For this purpose, a speech recognition device 2 for example being implemented by the CPU together with an appropriate programming, for example by a speech recognition software in ROM memory 7, is represented.

To simplify matters, the box referenced 2. The second vertical dashed line is assigned to a shared memory, e.g. to RAM-memory 6. The third vertical dashed line is assigned to unit 4 which provides a corresponding phoneme for a vocabulary for the recognition device or the recognition software. This can, for example, be directly provided by database 4 or by a corresponding program by the CPU too using a program part that provides a so called phoneme service. The right vertical dashed line is assigned to the input-/output-device 12, for example a GUI, being for example a touch screen or a combined keyboard-display-unit.

The speech recognition method is, for example, started in step R1 by inputting of a country characteristic by the user via GUI 12. The input is transferred to the recognition unit 2. In the following, a recognition unit is referred to as for example a program part having a speech recognition capability on a programmable computing device such as the CPU 2. The recognition unit 2, in step T21, starts prompting an appropriate first vocabulary for the corresponding country from the database 4 or from the phoneme service. Within the first step of the speech recognition, it is necessary, for example for a target input in a navigation system, to create a partial vocabulary for city names in which, in case of use of a HMM-model for speech recognition, the other expression parts such as those not including the expected expression part related the city name, within the framework of the HMM-model are modeled using garbage data.

The CPU or recognition unit 2 sends a corresponding phoneme enquiry R2 to the phoneme database 4 or to the phoneme service 4. In the following, in step R3, the necessary phonemes and/or further information, which may be necessary for speech recognition, is written into the shared memory 6 of the speech recognition device 1. The used memory space is relatively small compared to the complete database 4, since just city names, that is one expression part, are actively modeled while other expression parts of the recorded expression are unimportant in the first recognition step. After writing the necessary phoneme data into the memory, the sequence is ended in step R4 using a quit signal or done-order. The phoneme service 4 also provides a quit signal R5 to the recognition unit, which in the following step R6 reads the existing phoneme data from the shared memory 6.

The according recognition software or recognition unit 2 creates in step T22 the first vocabulary for carrying out of the first partial speech recognition for example for a HMM-model including garbage data for the expression parts that have not to be considered. After this, the memory space for the phoneme data can be released in step R7. This is communicated to phoneme service unit 4. After step R4 the partial speech recognition is completely prepared.

Thus in step R8, an input request can be forwarded to the user, for example using GUI 12. One possibility for the user is to input the complete target address for the navigation system using push-to-talk. This is conducted in step T1. The user inputs the complete target address in a complete sentence without any other inputs using the GUI. In case of push-to-talk, the beginning of a voice input is signalized to the recognition unit 2 by the user by a signal for example by pushing a button. In this way a fixed defined beginning of an expression to be recognized by the recognizing unit or the software, is predefined which lowers the computing expenses, since no beginning of an expression has to be expensively defined. Thus in step R9, the first partial speech recognition begins with defining a hit list from the vocabulary of search terms, which, in this case comprise a list of N hits of the best fitting city names. An exemplary list of the first hits H1-HN is represented in FIG. 5. The finding of this first step of speech recognition in step S1 can optionally be displayed by the GUI in step R10. This is not definitely necessary, since the speech recognition in the second step also considers the other expression parts, i.e. the street names and house numbers. To do this, a second speech recognition vocabulary has to be provided to the speech recognition unit 2.

Due to this, a query of the phoneme data of street names and/or house numbers concerning the first hit H1 of the first step of speech recognition is conducted in step R11. The phoneme data are transferred to the shared memory 6 in step R12, being acknowledged in step R7 and being communicated to recognizing unit 2 in step R14. In step R15, the recognition unit 2 reads the corresponding phoneme data and creates the vocabulary for the second step of speech recognition concerning the first hit of first step H1 in step T41.

Analogously, enquiries for street names data of the other hits, for example the second hit H2 are queried from the phoneme database in step R16. Again, the corresponding phoneme data are imported into the memory, in step R17, which is acknowledged in step R18 and, in step R19, communicated from the phoneme database to the recognition unit 2. The phoneme database or the phoneme-service 4 confirms the successful transfer of the queried phoneme data to memory 6 the of recognition unit 2. By phoneme data and optional further data, which are necessary for the creation of a vocabulary for the recognizing unit, in step T42, the recognition unit creates the vocabulary for the second step of the speech recognition, as is illustrated for example in FIG. 5 by the street names SN21-SN2O and the house numbers NB211-NB21S and NB2O1-NB2OT. Corresponding phoneme data queries and creations of vocabularies are conducted for every hit of the first recognition step H1-HN. By such a recognition vocabulary, the second step of speech recognition can be conducted for the complete expression.

The expression can, for example, be digitally stored in memory 6. Thus the recognition unit 2 queries the expression in step R20 and carries out the second step of speech recognition or the second stage of speech recognition S2. This is done using a vocabulary which has been created in dependence on the findings of the first recognition step. Finally, in step R21, a hit display is provided, which in case of the expression shown in FIG. 4 for example comprises the following possibilities:

München Otto-Hahn-Ring 6
München Otto-Hahn-Ring 60
München Otto-Hahn-Weg 6
München Otto-Hahn-Ring 16.

The previously described variants of a method for speech recognition reduce the necessary vocabulary needed for the recognition of, particularly multiple-part, expressions. This enables even resource-scarce embedded systems to implement speaker-independent speech recognition. The speech recognition of a complex expression having several expression parts is conducted in two or more steps. Depending on the recognition finding of the first step the vocabularies of the following steps are created. Even though the method has been explained basically using two recognition steps or stages, a generalization to more steps is easily possible. For the recognition of large thesauri the size of the vocabulary for the single step or recognition stage is significantly reduced.

The multilevel method for speech recognition has further the advantage to exhibit reduced loading times of the respective phoneme data or vocabulary data from a database. Conventional recognizers, recognizing longer expressions having several expression parts have to load the complete vocabulary including the whole complexity at the beginning of the speech recognition. This stresses the respective data or communication bus and requires a particularly big memory. With two or multilevel speech recognition according to the variants of the method, only small memory space is needed and the transfer of the respective phoneme or vocabulary data on a data bus is reduced.

By the use of the first for example N, hits of the first recognition step, the recognition rate too is improved as compared with the common strategy wherein independent recognition methods for a first expression part and a second expression part are carried out. This can especially be conducted while using logical connections or consistency checks in hierarchical databases having a generic term, such as city names, and other assigned terms like street names and house numbers. If in the first recognition step, for example N=20 hits are determined when the expression is "München Otto-Hahn-Ring 6" and "München" is just recognized on position 18 due to disturbing circumstances, still in the second step the combination "München Otto-Hahn-Ring 6" can occur as best fitting hit, if either in the other cities like Mün nchlingen or Mün nchhausen no street name "Otto-Hahn-Ring" exists or only other house numbers occur. Consequently, the connection of first and second recognition stages provides particularly reliable speech recognition of complex multiple-part expressions.

The previously described methods, thus, offer an improved recognition rate compared to conventional recognition methods. A reduced memory and computing necessity is needed.

Since vocabularies and phoneme data are reduced, the load of data transfer on the data bus is lower. The access to phoneme data and/or partial vocabularies is faster, since partial vocabularies for example street name vocabularies, for especially big cities having many street names can temporarily be stored. Parts of vocabularies complying with small cities having few streets can be dynamically generated online and do not have to be precompiled. By for the user having the appearance of one-step speech recognition of a complex input expression to be recognized, the input time of the target address is reduced. No more multiple-step or acknowledging processes are necessary by the user.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004). The previously described examples using a target input for a navigation system can be modified. At least if several parts of an expression are hierarchically organized, e.g. if a first expression part forms a generic term for other expression parts, the method can improve a speech recognition. In this respect, the presented tree in FIG. 5 can be related to several applications, like the search for music in a music player, where, as a generic term, for example the artist and as a further term the album and finally the track number or song number can be used. Even the number of expression parts and their arrangement within the expression can be subject to modification. The first expression part to be recognized could, for example, even be placed at the end of the complete expression.

The invention claimed is:

1. A computer-implemented method for speech recognition of a spoken expression, which comprises a first expression part and remaining expression parts to be recognized, comprising performing by a processor operations of:
    conducting a partial speech recognition on the first expression part using a Hidden-Markov-Model, wherein the remaining expression parts are covered by fill data, the partial speech recognition using a first vocabulary having a list of search terms for the first expression part;
    selecting N best fitting hits for the first expression part from the list of search terms;
    creating a second vocabulary, different than the first vocabulary, the second vocabulary comprising a list of search term combinations depending on the selected N best fitting hits for the first expression part, the second vocabulary having a list of search term combinations that covers the remaining expression parts previously covered by the fill data;
    conducting a second speech recognition on the remaining expression parts using the second vocabulary; and
    providing a result, including a speech-recognized result of the first expression part and a speech-recognized result of the remaining expression parts.

2. The method according to claim 1, wherein the first expression part is selected from the spoken expression based on a temporal energy contour of the spoken expression.

3. The method according to claim 1, wherein the first expression part is selected from the spoken expression based on a speech activity recognition in the expression.

4. The method according to claim 1, wherein the method recognizes the spoken expression using a hierarchically built database in which a generic city name term has further street address terms assigned thereto, and the further street address terms have even further house number subtopics are assigned thereto.

5. The method according to claim 1, wherein after conducting the partial speech recognition, the first vocabulary is deleted from a memory and the second vocabulary is loaded into the memory.

6. The method according to claim 1, wherein the first expression part is located at the beginning of the spoken expression.

7. The method according to claim 1 wherein at least parts of said second vocabulary are precompiled.

8. The method according to claim 1 wherein a partial vocabulary is precompiled for the second vocabulary, and reference vectors of a Hidden-Markov-Model are calculated and stored for the partial vocabulary.

9. The method according to claim 1, wherein the list of search terms of the first vocabulary comprises a list of city names, and the list of search term combinations of the second vocabulary comprises a list of city name and street address combinations.

10. A speech recognition device to recognize a spoken expression, which comprises a first expression part and remaining expression parts to be recognized, the speech recognition device comprising:
 a database including a memory and providing at least one of search terms and a phonemic transcription of the search terms; and
 a control unit connected to the database and configured to:
  conduct a partial speech recognition on the first expression part using a Hidden-Markov-Model, wherein the remaining expression parts are covered by fill data, the partial speech recognition using a first vocabulary having a list of search terms for the first expression part;
  select N best fitting hits for the first expression part from the list of search terms;
  create a second vocabulary, different than the first vocabulary, the second vocabulary comprising a list of search term combinations depending on the selected N best fitting hits for the first expression part, the second vocabulary having a list of search term combinations that covers the remaining expression parts previously covered by the fill data;
  conduct a second speech recognition on the remaining expression parts using the second vocabulary; and
  provide a result, including a speech-recognized result of the first expression part and a speech-recognized result of the remaining expression parts.

11. The speech recognition device according to claim 10, wherein the speech recognition device is embedded in a motor vehicle.

12. The speech recognition device according to claim 11, wherein said speech recognition device is part of a vehicle navigation system.

13. The speech recognition device according to claim 11, wherein said speech recognition device is formed as a part of a mobile phone and/or of an audio player.

14. The speech recognition device according to claim 10, wherein the list of search terms of the first vocabulary comprises a list of city names, and the list of search term combinations of the second vocabulary comprises a list of city name and street address combinations.

15. A computer readable storage medium storing a program, which when executed by a computer performs a method for speech recognition of a spoken expression, which comprises a first expression part and remaining expression parts to be recognized, the method comprising:
 conducting a partial speech recognition on the first expression part using a Hidden-Markov-Model wherein the remaining expression parts are covered by fill data, the partial speech recognition using a first vocabulary having a list of search terms for the first expression part;
 selecting N best fitting hits for the first expression part from the list of search terms;
 creating a second vocabulary, different than the first vocabulary, the second vocabulary comprising a list of search term combinations depending on the selected N best fitting hits for the first expression part, the second vocabulary having a list of search term combinations that covers the remaining expression parts previously covered by the fill data;
 conducting a second speech recognition on the remaining expression parts using the second vocabulary; and
 providing a result, including a speech-recognized result of the first expression part and a speech-recognized result of the remaining expression parts.

16. The computer readable storage medium according to claim 15, wherein the list of search terms of the first vocabulary comprises a list of city names, and the list of search term combinations of the second vocabulary comprises a list of city name and street address combinations.

* * * * *

UNITED STATES PATENT AND TRADEMARK OFFICE
CERTIFICATE OF CORRECTION

PATENT NO. : 8,527,271 B2  Page 1 of 1
APPLICATION NO. : 12/452707
DATED : September 3, 2013
INVENTOR(S) : Wandinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 708 days.

Signed and Sealed this
Fifteenth Day of September, 2015

Michelle K. Lee
*Director of the United States Patent and Trademark Office*